(12) United States Patent
Buerkle et al.

(10) Patent No.: US 8,452,492 B2
(45) Date of Patent: May 28, 2013

(54) DRIVER ASSISTANCE DEVICE AND METHOD FOR CONTROLLING IT

(75) Inventors: Lutz Buerkle, Leonberg (DE); Tobias Rentschler, Pforzheim (DE); Thomas App, Zaisenhausen (DE)

(73) Assignee: Obert Bosch GmbH, Stuttgart (DE)

( * ) Notice: Subject to any disclaimer, the term of this patent is extended or adjusted under 35 U.S.C. 154(b) by 772 days.

(21) Appl. No.: 12/598,894

(22) PCT Filed: Mar. 26, 2008

(86) PCT No.: PCT/EP2008/053532
§ 371 (c)(1),
(2), (4) Date: Nov. 4, 2009

(87) PCT Pub. No.: WO2008/138673
PCT Pub. Date: Nov. 20, 2008

(65) Prior Publication Data
US 2010/0138101 A1 Jun. 3, 2010

(30) Foreign Application Priority Data
May 11, 2007 (DE) .......................... 10 2007 022 184

(51) Int. Cl.
*B60R 21/00* (2006.01)
*G06F 7/00* (2006.01)
*A01B 69/00* (2006.01)

(52) U.S. Cl.
USPC ....... 701/41; 701/1; 701/36; 701/46; 708/530

(58) Field of Classification Search
None
See application file for complete search history.

(56) References Cited

U.S. PATENT DOCUMENTS

| | | | |
|---|---|---|---|
| 6,493,619 B2 * | 12/2002 | Kawazoe et al. | 701/41 |
| 6,778,890 B2 * | 8/2004 | Shimakage et al. | 701/41 |
| 7,539,566 B2 * | 5/2009 | Tange et al. | 701/41 |
| 2006/0217887 A1 * | 9/2006 | Iwasaka | 701/301 |
| 2009/0216404 A1 * | 8/2009 | Maass | 701/41 |

FOREIGN PATENT DOCUMENTS

| | | |
|---|---|---|
| CN | 1400944 | 3/2003 |
| EP | 1 783 719 | 5/2007 |
| EP | 1 977 943 | 10/2008 |
| WO | WO 2007042462 A1 * | 4/2007 |
| WO | WO 2007/051671 | 5/2007 |

* cited by examiner

*Primary Examiner* — Thomas Black
*Assistant Examiner* — Paul Castro
(74) *Attorney, Agent, or Firm* — Kenyon & Kenyon LLP

(57) ABSTRACT

A driver assistance device for a vehicle having a plurality of safety functions, such as in particular an LDW function and an LKS function, in which system-related boundary values are provided for the safety functions such that when they are undershot the safety function is activated and when they are exceeded the safety function is deactivated. The boundary values are developed to be variable.

16 Claims, 3 Drawing Sheets

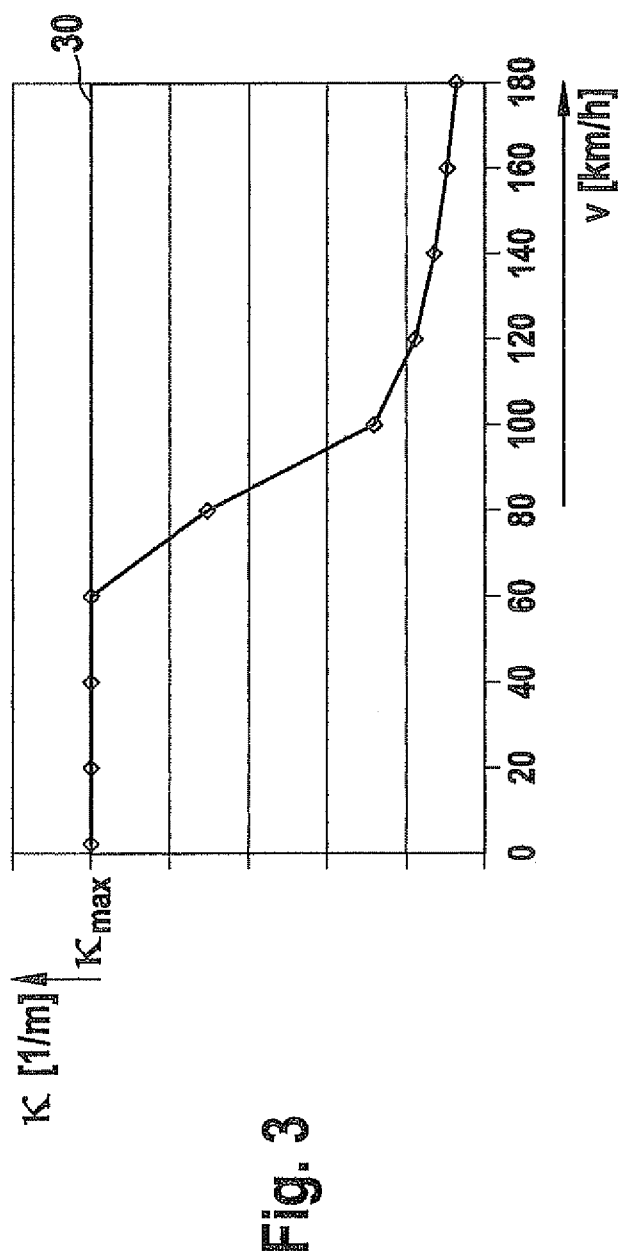

DRIVER ASSISTANCE DEVICE AND METHOD FOR CONTROLLING IT

FIELD OF THE INVENTION

The present invention relates to a driver assistance device, and to a method for controlling a driver assistance system.

BACKGROUND INFORMATION

It is understood that there are driver assistance systems which support the driver in keeping to a selected traffic lane. For this purpose, the driver assistance system includes assistance functions such as LDW (lane departure warning) and/or LKS (lane keeping support). Assistance function LDW warns the driver of leaving the traffic lane by generating optical and/or acoustic and/or haptic signals. Assistance function LKS actively intervenes in on-board systems of the vehicle, such as the steering system, for example, and/or the braking system or an ESP system, in order to keep a vehicle deviating from the traffic lane in the traffic lane. For this purpose, the driver assistance system includes a sensor system including in particular at least one video sensor for detecting traffic lane markings or the like.

German patent document DE 101 37 292 A1 discusses a method for operating a driver assistance system of a vehicle, particularly of a motor vehicle, having a servo-supported steering system. This method is characterized by the following steps:

acquiring or estimating surroundings data, which may be of a current traffic situation, acquiring or estimating what may be current motion data of the vehicle, comparing the acquired or estimated surroundings data to the motion data of the vehicle, modifying the support of a steering handle in accordance with the comparison.

By way of restrictions, e.g. in the detecting range of sensors used in the driver assistance system or in the validity of model assumptions made in the design of the driver assistance system, system boundaries are defined beyond which the driver himself must again assume full control over guiding the vehicle. When a predefined system boundary is reached, for example by losing the traffic lane or its marking, exceeding a maximum value of lateral acceleration or the like, the assistance function provided until this point in time by the driver assistance system is deactivated.

In a driver assistance system having an LKS function, the guidance torque applied by the driver assistance system on the steering wheel is then reduced for example. The driver himself must then completely take over again the lateral guidance of the vehicle. Because the mentioned system boundaries of a driver assistance system are exclusively technically motivated, they are often not intelligible or comprehensible for a driver since they do not coincide with his own perception. This results in uncertainty on the part of the driver and in a lack of acceptance of the driver assistance system.

SUMMARY OF THE INVENTION

The exemplary embodiments and/or exemplary methods of the present invention are based on the objective of improving a driver assistance system of the species by increasing the driver's acceptance of the system and thereby improving the driving comfort subjectively sensed by the driver.

Starting from a driver assistance system according to the features described herein, this objective is achieved by the features described herein.

The exemplary embodiments and/or exemplary methods of the present invention allows for an additional improvement in driving comfort in a vehicle equipped with a driver assistance system and thus for an increased acceptance of such a system on the part of the driver. By developing the system-related boundary values, which determine the activation and deactivation of a safety function of the driver assistance system, to be variable, they correspond better to the driver's subjective perception such that the driver is better able to comprehend the system reaction, that is, the deactivation when the system boundary is exceeded.

Particularly advantageously, boundary values are predefined for the activation or deactivation of the LKS function in such a way that the LKS function is activated within the boundary values and is deactivated outside of these boundary values, the mentioned boundary values being monitored continuously while the vehicle is traveling. Particularly advantageously, the boundary values are a function of readily measurable performance characteristics of the vehicle. Thus, as a safety function that supports the driver in keeping to the traffic lane, the LKS function may have advantageously assigned to it the lateral acceleration of the vehicle as a system-related boundary value, the lateral acceleration in turn being a function of the velocity of the vehicle.

Additional advantages are obtained from the further description herein and the drawings.

Specific embodiments of the present invention are explained in greater detail below with reference to the drawings.

BRIEF DESCRIPTION OF THE DRAWINGS

FIG. 3 shows a diagram showing a representation of the system boundary of the curvature as a function of the velocity.

DETAILED DESCRIPTION

Figure 1:
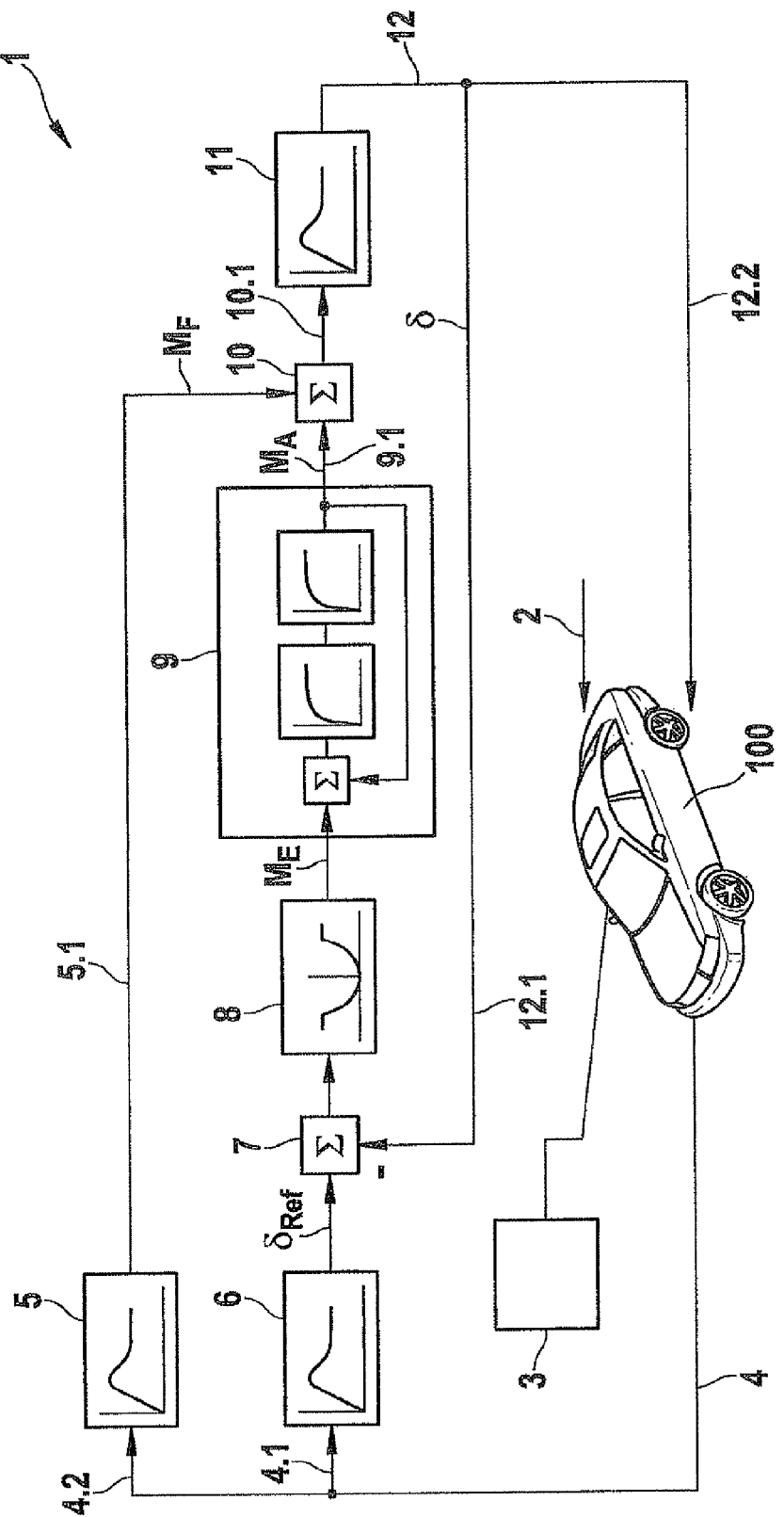
FIG. 1 shows a block diagram of a driver assistance system having an LKS function.

Specific embodiments of the present invention are explained in greater detail below with reference to the drawing. The exemplary embodiments and/or exemplary methods of the present invention is based on the realization that the acceptance of a driver assistance system and the assistance functions that it provides may be improved if the system boundaries provided in the driver assistance system are more oriented toward the driver's subjective sense of safety and comfort. It is then possible for the driver to comprehend the system boundaries because they coincide with his own perception.

FIG. 1 shows a block diagram of a driver assistance device 1 having an LKS function situated in a vehicle 100. The amount of the deviation of the vehicle, the differential angle, the curvature of the traffic lane are detected via appropriate sensors and are supplied via paths 4, 4.1 to a function module of driver assistance system 1, which includes a reference model 6 for the lateral guidance of vehicle 100. A reference angle $\delta_{Ref}$ is formed from the mentioned input variables with the aid of reference model 6. This reference angle is supplied to a first input of another function module 7 (summation node 7), whose output is connected to another function module.

This function module includes a guidance characteristics curve 8 for the LKS function of driver assistance system 1. The function module including guidance characteristic curve 8 is connected to a steering actuator 9 having a torque control loop. Steering actuator 9 is connected to a first input of another function module (summation node 10). Path 9.1 represents the steering intervention of the LKS system. At the same time, driver 5 perceives the vehicle's position in the lane (path 4.2) and steers the vehicle by the steering wheel (driver steering intervention 5.1). The driver's command and the system intervention act jointly via summation node 10 on steering system 11 (path 10.1) and control the lateral motion of vehicle 100 via paths 12, 12.2 and by influencing the steering angle. A reaction to summation node 7 occurs via path 12.1. Interferences act on vehicle 100 via path 2 that is indicated schematically.

Frequently the so-called single-track model is used for modeling the lateral vehicle dynamics when implementing an LKS function of a driver assistance system. From the limited validity of this model approximately up to a maximum lateral acceleration $a_q$ of 4 m/s$^2$, a rigid system boundary unvarying over the velocity may be derived in the lateral acceleration of the vehicle for the LKS function of a driver assistance system. It was discovered, however, that the lateral acceleration at which a driver subjectively still perceives cornering as comfortable and safe depends greatly on the velocity of the vehicle.

In addition, this impression may vary from driver to driver since it depends on the subjective sensation. The practical implementation of a system boundary for the lateral acceleration that is rigid across the entire velocity range, as it would be technically motivated by the single-track model, would thus normally not correspond to a driver's sense of safety and comfort.

Figure 2:
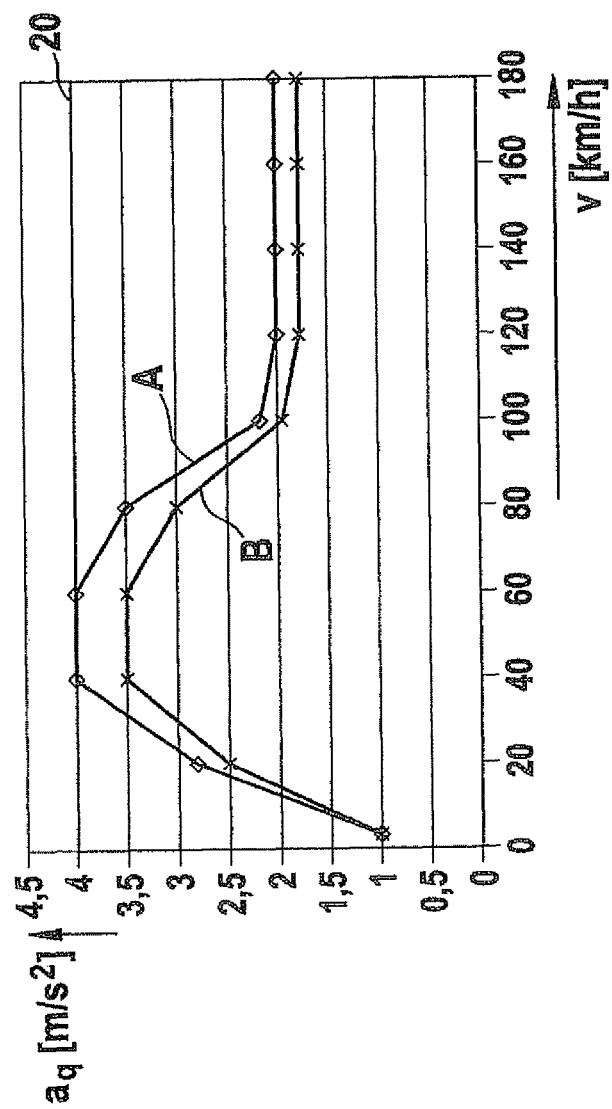
FIG. 2 shows a diagram showing a representation of the system boundary of the lateral acceleration of the LKS function as a function of the velocity.

In order to take this realization into account, the exemplary embodiments and/or exemplary methods of the present invention provides for a velocity-dependent adaptation of the lateral acceleration as the system boundary. This is explained in more detail in the following with reference to FIG. 2. The diagram shown in FIG. 2 shows the lateral acceleration as a function of the velocity. The range of validity of the single-track model is indicated by reference numeral 20. It extends on the lateral acceleration axis up to approximately 4 m/s$^2$ irrespective of the velocity. Individual measuring points, which are interconnected by a line, are represented in curves A and B.

This line thus represents the system boundary of an LKS function with respect to the lateral acceleration implemented in accordance with the exemplary embodiments and/or exemplary methods of the present invention. Below the system boundary, the LKS function is activated. If this system boundary were exceeded, the LKS function would be deactivated. In that case, the driver would then again have to take over the lateral guidance of the vehicle independently, that is, without support from the driver assistance system. The diagram (curve A) shown in FIG. 2 reveals that the system boundary associated with the lateral acceleration in the case of an activated LKS function initially rises with a rising velocity in a first velocity range before reaching approximately in a second velocity range between approximately 60 km/h and approximately 80 km/h a system-related maximum value at approximately 4 m/s$^2$.

The range of the lateral acceleration oriented toward the comfort of the driver is thus a subset of the validity range of the single-track model and thus compatible with the system boundary in the lateral acceleration of the vehicle of approximately 4 m/s$^2$ established on technical grounds. In a third velocity range between approximately 60 km/h and approximately 120 km/h, the lateral acceleration falls again with a rising velocity. Finally, in a fourth velocity range between approximately 120 km/h and the maximum velocity of the vehicle, the lateral acceleration has a constant value that lies below the system-related maximum value. The above representation is only by way of example. It lies within the framework of the present invention to differentiate the possible velocity ranges further in the context of alternative variants of an embodiment, that is, to provide more than four velocity ranges or fewer than four velocity ranges, for example.

In another advantageous variant of an embodiment, the functional relationship between velocity v and the system boundary of lateral acceleration $a_q$ is described by the following equation:

$$a_q = k_1 v e^{-k_2\left(\frac{v}{v_{ref}}\right)} \text{ with } k_1, k_2, v_{ref} \text{ as parameters.} \quad (1)$$

In a particularly advantageous variant of an embodiment of the present invention, the characteristic of the graph (curve A, curve B) shown in FIG. 2 may additionally be modified in a manner specific to the driver. For example, a characteristic curve as in curve A may be set for a first driver, and a characteristic curve as in curve B may be set for a second driver.

In a first variant of an embodiment of the present invention, this setting may advantageously occur manually in that the driver actuates a switching means provided for this purpose, for example.

Particularly advantageously, this driver-specific adaptation may also occur automatically in that the driver assistance system detects, for example, on the basis of the actuation of the accelerator pedal, the driving characteristic of the vehicle preferred by the respective driver and selects the boundary values of the assistance functions accordingly.

Lane curvature κ presents a similar situation as the previously described system boundary. It is essentially determined technically by the limited horizontal detecting range of a video sensor provided in the driver assistance system. For example, in the case of a horizontal opening angle of the video sensor of approximately 35° it is possible for the video sensor system reliably to detect lane curvatures up to a maximum of $\kappa_{max}=0.007$ 1/m. On the other hand, the safety- and comfort-oriented system boundary for the lateral acceleration may also be applied directly to the lane curvature by the equation $$a_q = v^2 \kappa \quad (2)$$

such that the system boundary for the lane curvature shown in FIG. 3 may be derived directly from the comfort-oriented system boundary for the lateral acceleration. In a first velocity range extending up to and including approximately 60 km/h, the position of the system boundary in the lane curvature is limited to a constant value $\kappa_{max}$ due to the limited detecting range of the video sensor. In a subsequent velocity range extending up to the maximum velocity of the vehicle, the system boundary then decreases monotonically in accordance with the relationship with the comfort-oriented lateral acceleration. Reference numeral 30 indicates the detecting range of the video sensor. It is independent of the velocity.

Particularly advantageously, the characteristic curves are stored in the form of interpolation points as a characteristics map 3 in a memory device of driver assistance system 1, as shown in FIGS. 2 and 3. At a certain velocity, an interpolation is performed in a linear manner between the nearest interpolation points in order to ascertain the system boundary associated with the particular velocity.

What is claimed is:

1. A driver assistance device for a vehicle, comprising: a plurality of safety arrangements, including at least one of:
   an LDW function (LDW=lane departure warning) arrangement, and
   an LKS function (LKS=lane keeping support) arrangement;
   wherein system-related boundary values are provided for the safety arrangements such that when they are not exceeded the safety arrangement is activated and when they are exceeded the safety arrangement is deactivated, and
   wherein the boundary values are variable and these boundary values are a function of a velocity of the vehicle, and
   wherein the boundary value of a lateral acceleration is described by the function $$a_q = k_1 v e^{-k_2\left(\frac{v}{v_{ref}}\right)}.$$

2. The driver assistance device of claim 1, wherein the boundary values are a function of performance characteristics of the vehicle.

3. The driver assistance device of claim 1, wherein the safety arrangement is the LKS function arrangement, the lateral acceleration is a system-related boundary value of the LKS function arrangement, and these boundary values is a function of the velocity of the vehicle.

4. The driver assistance device of claim 1, wherein in a first velocity range the boundary value of the lateral acceleration rises with a rising velocity.

5. The driver assistance device of claim 4, wherein the first velocity range is between approximately 5 km/h and approximately 40 km/h.

6. The driver assistance device of claim 1, wherein in a second velocity range the boundary value of the lateral acceleration is essentially constant with a rising velocity and has the system-related maximum value.

7. The driver assistance device of claim 6, wherein the second velocity range is between approximately 40 km/h and approximately 60 km/h.

8. The driver assistance device of claim 1, wherein in a third velocity range the boundary value of the lateral acceleration decreases with a rising velocity.

9. The driver assistance device of claim 8, wherein the third velocity range is between approximately 60 km/h and approximately 120 km/h.

10. The driver assistance device of claim 1, wherein in a fourth velocity range the boundary value of the lateral acceleration is essentially constant with a rising velocity and is below the system-related maximum value.

11. The driver assistance device of claim 10, wherein the fourth velocity range is between approximately 120 km/h and the maximum velocity of the vehicle.

12. The driver assistance device of claim 1, wherein the characteristic curve of the boundary values is selected on the basis of actuation of an accelerator pedal by the driver.

13. The driver assistance device of claim 1, wherein the system boundaries are stored as interpolation points in a characteristics map.

14. The driver assistance device of claim 1, wherein the boundary value of the lateral acceleration is described by an exponential function of the vehicle velocity.

15. A computer-implemented method for controlling a driver assistance arrangement, which includes at least one of an LDW function arrangement and an LKS function arrangement, the method comprising:
    detecting, by a processor, a performance characteristic of the vehicle associated with at least one of the safety arrangements of the driver assistance device;
    determining, by the processor, a system boundary associated with the detected performance characteristic; and
    activating, by the processor, the at least one safety arrangement when the system boundary is not exceeded, and deactivating the at least one safety arrangement when the system boundary is exceeded, Wherein the boundary values are variable and this boundary value is a function of the velocity of the vehicle, and
    wherein the boundary value of a lateral acceleration is described by the function $$a_q = k_1 v e^{-k_2\left(\frac{v}{v_{ref}}\right)}.$$

16. The method of claim 15, wherein a velocity of the vehicle is detected, a lateral acceleration of the vehicle is detected, a check is performed to determine whether the lateral acceleration is below or above a value of the lateral acceleration stored as the system boundary, and the safety arrangement is deactivated if the lateral acceleration is above the system boundary value.

* * * * *